United States Patent [19]

Tanaka et al.

[11] Patent Number: 5,144,918
[45] Date of Patent: Sep. 8, 1992

[54] INTAKE SYSTEM FOR ENGINE

[75] Inventors: Toshimitsu Tanaka; Naoyuki Yamagata; Mitsuo Hitomi; Toshihiko Hattori; Masashi Marubara; Mikihito Fujii, all of Hiroshima, Japan

[73] Assignee: Mazda Motor Corporation, Hiroshima, Japan

[21] Appl. No.: 732,125

[22] Filed: Jul. 18, 1991

[30] Foreign Application Priority Data

| Jul. 19, 1990 | [JP] | Japan | 2-192120 |
| Sep. 25, 1990 | [JP] | Japan | 2-258487 |
| Sep. 26, 1990 | [JP] | Japan | 2-99718[U] |
| Sep. 28, 1990 | [JP] | Japan | 2-261092 |

[51] Int. Cl.$^5$ ............................................. F02M 35/10
[52] U.S. Cl. ............................ 123/52 M; 123/52 MB
[58] Field of Search ........ 123/52 M, 52 MV, 52 MC, 123/52 MB, 52 MF

[56] References Cited

U.S. PATENT DOCUMENTS

| 3,363,610 | 1/1968 | Massarotti | 123/52 M |
| 4,186,695 | 2/1980 | Gartner et al. | 123/52 M |
| 4,341,186 | 7/1982 | Mayr et al. | 123/52 M |
| 4,501,235 | 2/1985 | Muller | 123/52 M |
| 4,664,075 | 5/1987 | Poulos | 123/52 M |
| 4,932,378 | 6/1990 | Hitomi et al. | 123/432 |
| 5,048,470 | 9/1991 | Geddes et al. | 123/52 MB |

FOREIGN PATENT DOCUMENTS

| 624880 | 8/1961 | Canada | 123/52 M |
| 0182223 | 5/1986 | European Pat. Off. . | |
| 1380153 | 10/1964 | France | 123/52 M |
| 0048720 | 4/1977 | Japan | 123/52 M |
| 55-019976 | 2/1980 | Japan . | |
| 0043923 | 3/1984 | Japan | 123/52 M |
| 0255217 | 11/1986 | Japan | 123/52 M |
| 0018178 | 1/1988 | Japan | 123/52 M |
| 2229768 | 10/1990 | United Kingdom . | |

Primary Examiner—David A. Okonsky
Attorney, Agent, or Firm—Sixbey, Friedman, Leedom & Ferguson

[57] ABSTRACT

Discrete intake passages communicating with respective cylinders of a multiple-cylinder in-line engine are merged into an integrated chamber at their upstream ends. The integrated chamber is disposed above the engine and extends substantially horizontally. Each discrete intake passage extends from the engine body, bends upward toward the integrated chamber and is connected to the downstream side end face of the integrated chamber. The discrete intake passages for the cylinders which are positioned relatively near to the integrated chamber are connected to the downstream side end face of the integrated chamber at an upper portion of the end face and the discrete intake passages for the cylinders which are positioned relatively far from the integrated chamber are connected to the downstream side end face of the integrated chamber at a lower portion of the end face.

11 Claims, 14 Drawing Sheets

INTAKE SYSTEM FOR ENGINE

BACKGROUND OF THE INVENTION

1. Field of the Invention

This invention relates to an intake system for an engine, and more particularly to an intake system for an engine which is arranged to supercharge the engine by kinetic effect of intake air.

2. Description of the Prior Art

There has been known an intake system an engine which is arranged to supercharge the engine by kinetic effect of intake air such a inertia effect of intake air, thereby increasing the air charging efficiency and the engine output torque.

That is, in the supercharging of the engine by the inertia effect of intake air, a negative pressure wave generated in the intake port at the beginning of the intake stroke in each of the cylinders in response to opening of the intake valve in a predetermined engine speed range (tuning engine speed range) propagates upstream at a sonic speed through the discrete intake passage connected to the intake port and is reflected at a volume chamber as a positive pressure wave. The positive pressure wave propagates downstream at a sonic speed through the same path and reaches the intake port of the same cylinder immediately before closure of the intake valve at the end of the intake stroke to force air into the cylinder.

As the volume chamber which reflects the pressure wave, a surge tank is generally used. However, in the case of the surge tank, the effective length of the passage which joins the discrete intake passage and the intake passage upstream of the surge tank through the surge tank differs from cylinder to cylinder and accordingly, distribution of intake air and the inertia effect of intake air varies from cylinder to cylinder.

In the intake system disclosed in Japanese Unexamined Utility Model Publication No. 60(1985)-88062, discrete intake passages communicating with respective cylinders of an engine extend from the cylinders on one side of the engine and merge into an integrated chamber having an inner space which is like a truncated cone in shape. The upstream ends of the discrete intake passages are connected to the larger end face of the integrated chamber and the downstream end of a common intake passage is connected to the smaller end face of the same. The openings at which the discrete intake passages communicate with the integrated chamber are symmetrically disposed about the central axis of the larger end face of the integrated chamber. With this arrangement, the distances between the downstream end of the common intake passage and the upstream ends of the discrete intake passages are substantially equal to each other, whereby the intake air distribution is uniformed. Further, the upstream ends of the discrete intake passages are disposed close to each other, each discrete intake passage functions as a volume chamber in the inertia effect supercharging of the cylinders communicated with the other discrete intake passages, whereby the integrated chamber can be small in volume.

In the case of an in-line engine, when the integrated chamber is disposed on one side of the engine body at the middle between the front and rear ends of the engine body, the discrete intake passages can be substantially equal to each other in length and radius of curvature. However when the integrated chamber is disposed on one side of the engine body, the width of the engine body increases.

However, when the integrated chamber is disposed above one end of the engine body and the discrete intake passages are simply connected to the integrated chamber, the discrete intake passages for the cylinders far from the end of the engine body must be longer than the discrete intake passages for the cylinders near the end, and at the same time, the discrete intake passages for the cylinders near end of the engine body must be curved more sharply than those far from the end, which leads to non-uniform air distribution and non-uniform inertia effect of intake air.

SUMMARY OF THE INVENTION

In view of the foregoing observations and description, the primary object of the present invention is to provide an intake system for an engine which can reduce the overall size of the engine and can uniformly distribute intake air to the cylinders.

In accordance with the present invention, discrete intake passages communicating with respective cylinders of a multiple-cylinder in-line engine are merged into an integrated chamber at their upstream ends. The integrated chamber is disposed above the engine and extends substantially horizontally. Each discrete intake passage extends from the engine body, bends upward toward the integrated chamber and is connected to the downstream side end face of the integrated chamber. The discrete intake passages for the cylinders which are positioned relatively near to the integrated chamber are connected to the downstream side end face of the integrated chamber at an upper portion of the end face and the discrete intake passages for the cylinders which are positioned relatively far from the integrated chamber are connected to the downstream side end face of the integrated chamber at a lower portion of the end face.

DESCRIPTION OF THE PREFERRED EMBODIMENTS

Figure 1:
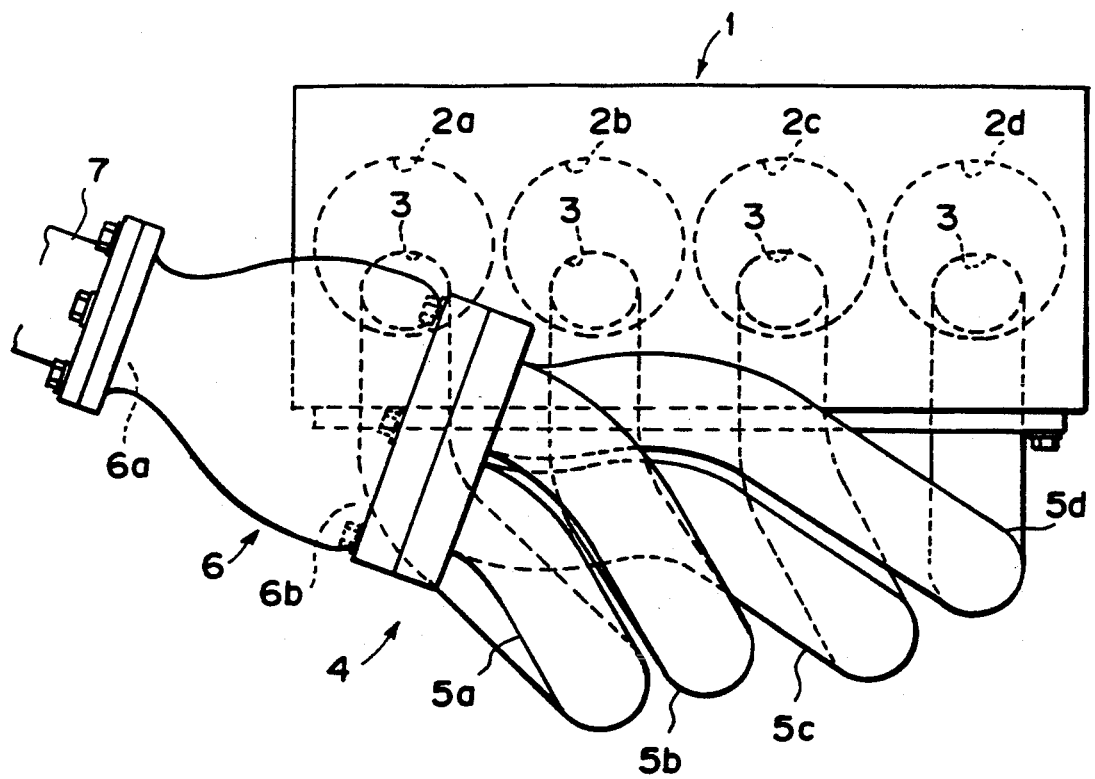
FIG. 1 is a plan view of an intake system in accordance with a first embodiment of the present invention.
Figure 2:
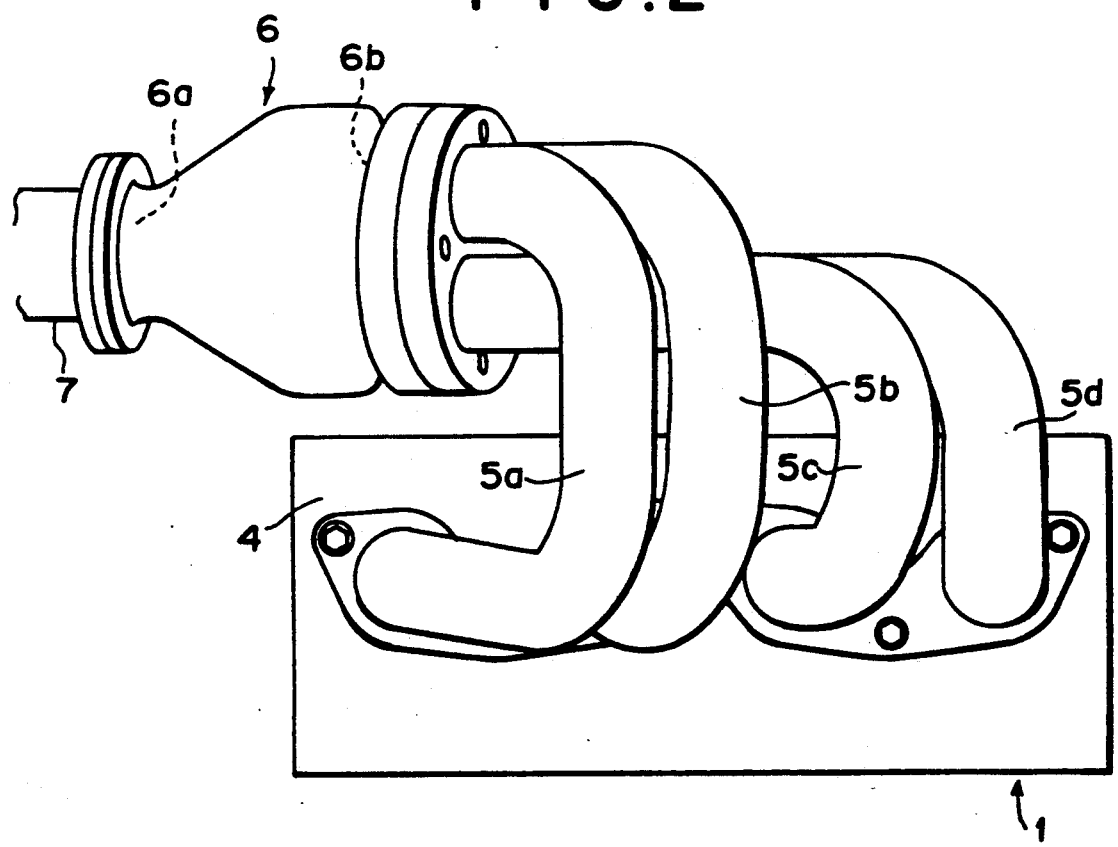
FIG. 2 is a side view of the intake system.
Figure 3:
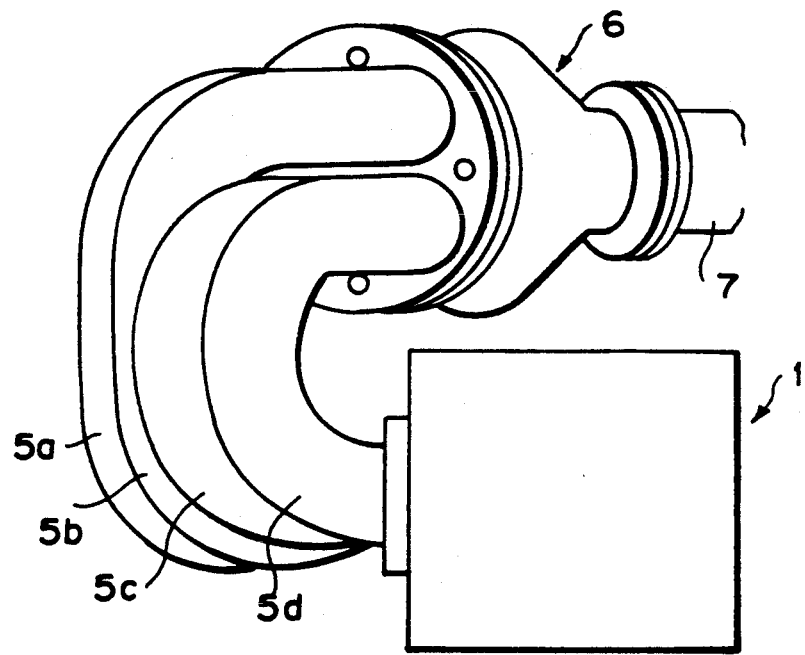
FIG. 3 is a front view of the intake system.

In FIGS. 1 to 3, a four-cylinder in-line engine 1 has first to fourth cylinders 2a to 2d which are disposed at regular intervals. The firing order is 1-3-2-4.

An intake passage 4 comprises four discrete intake passages 5a to 5d which communicate with the respective cylinders 2a to 2d through intake ports 3 at their downstream ends and to an integrated chamber 6 at their upstream ends. The integrated chamber 6 is of a truncated cone in shape and has an upstream side end face 6a and a downstream side end face 6b, the latter being larger than the former in diameter and the cross-sectional area of the integrated chamber 6 smoothly increasing from the upstream side end face 6a to the downstream side end face 6b. The discrete intake passages 5a to 5d are connected to the downstream side end face 6b and a common intake passage 7 is connected to the upstream side end face 6a coaxially with the integrated chamber 6. The discrete intake passages 5a to 5d are made of aluminum pipe materials and the upstream ends thereof are merged into the integrated chamber 6 close to each other. The discrete intake passages 5a to 5d extend from one side of the engine 1 and the integrated chamber 6 is disposed above the engine 1 on one side of the cylinder row.

Figure 4:
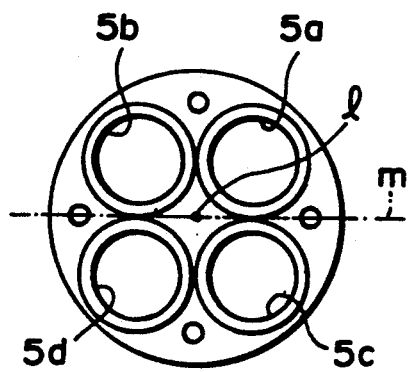
FIG. 4 shows the arrangement of the arrangement of the upstream ends of the discrete intake passages in the downstream side end face of the integrated chamber.

As clearly shown in FIG. 4, the upstream ends of the discrete intake passages 5a to 5d are disposed about the central axisl of the downstream end of the common intake passage 7 the center of each of the upstream ends of the discrete intake passages 5a to 5d on a corner of a square.

The discrete intake passages 5a and 5b for the first and second cylinders 2a and 2b which are disposed nearer to the integrated chamber 6 than the other cylinders extend from the engine 1 once horizontally away from the engine 1, bend upward and then bend to extend horizontally toward the integrated chamber 6. On the other hand, the discrete intake passages 5c and 5d for the third and fourth cylinders 2c and 2d extend from the engine 1 once horizontally away from the engine 1, curve upward on a semicircle and then extend horizontally toward the integrated chamber 6. Thus the discrete intake passages 5c and 5d for the cylinders 2c and 2d which are disposed farther from the integrated chamber 6 than the other cylinders 2a and 2b bend more sharply than the discrete intake passages 5c and 5d for the other cylinders 2c and 2d.

Further as clearly shown in FIG. 4, the discrete intake passages 5a and 5b open to the downstream side end face 6b of the integrated chamber 6 at the portion above a horizontal line m which is perpendicular to the central axis l of the downstream end of the common intake passage 7 and the integrated chamber 6, while the discrete intake passages 5c and 5d open to the downstream side end face 6b of the integrated chamber 6 at the portion below the horizontal line m.

Thus in this embodiment, the discrete intake passage 5c and 5d extend in the vertical direction by a length which is smaller than the length by which the discrete intake passages 5a and 5b extend in the vertical direction, whereby the difference in distance from the integrated chamber 6 is compensated for and the discrete intake passages 5a to 5d can be substantially equal to each other in length and accordingly intake air can be substantially uniformly distributed to all the cylinders 2a to 2d and inertia effect of intake air can be better used for supercharging the engine 1.

Further since the discrete intake passages 5a and 5b extend bypassing the discrete intake passages 5c and 5d and then connected to the integrated chamber 6 on the upper side of the discrete intake passages 5c and 5d, the discrete intake passages 5a and 5b may be relatively gently bent and accordingly intake resistance is reduced.

Second to fifth embodiments of the present invention will be described with reference to FIGS. 5 to 9, hereinbelow. In FIGS. 5 to 9, the parts analogous to those shown in FIGS. 1 to 4 are given the same reference numerals and will not be described.

The second embodiment is very similar to the first embodiment, and accordingly only the difference between the first and second embodiments will be described here.

Figure 5:
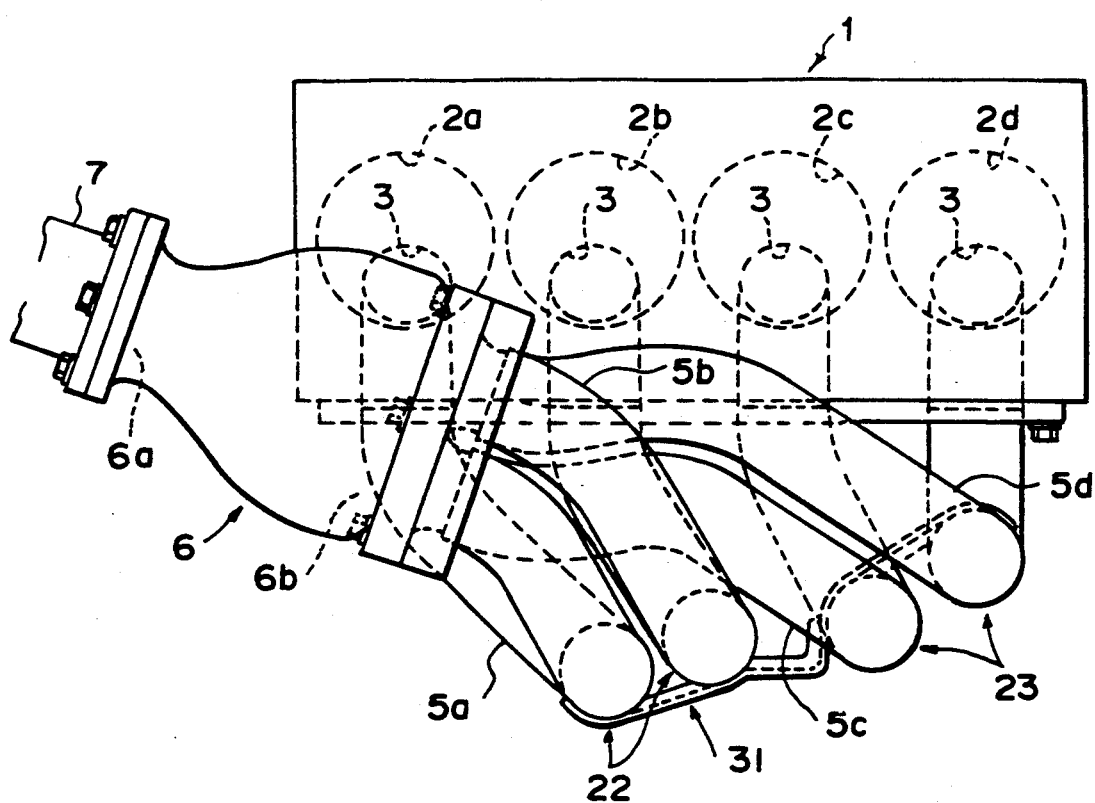
FIG. 5 is a view similar to FIG. 1 but showing a second embodiment of the present invention.

In this embodiment, a stay 31 extends transversely to the discrete intake passages 5a to 5d (substantially in parallel to the cylinder row) to join the outer surfaces (lower surfaces as seen in FIG. 5) of the bent portions (indicated at 22 in FIG. 5) of the discrete intake passages 5a and 5b and the inner surfaces (upper surfaces as seen in FIG. 5) of the bent portions (indicated at 23) of the discrete intake passages 5c and 5d. That is, the stay 31 extends from the lower side of the bent portion 22 of the discrete intake passage 5a across the lower side of the bent portion 22 of the discrete intake passage 5b, is bent upward between the discrete intake passages 5b and 5c, and further extends to the upper side of the bent portion 23 of the discrete intake passage 5d across the upper side of the bent portion 23 of the discrete intake passage 5c.

Since the discrete intake passages 5a to 5d are formed by bending pipe materials, the wall thicknesses of the inner and outer sides of the bent portions 22 of the discrete intake passages 2a and 2b, which are relatively gently bent, are substantially equal to each other, while the wall thickness of the inner sides of the bent portions 23 of the discrete intake passages 5c and 5d are larger than those of the outer sides. The stay 31 reinforces the bent portions 22 and 23 to withstand stress acting on the bent portions 22 and 23. Further the stay 31 increases the rigidity of all the discrete intake passages 5a to 5d and the discrete intake passages 5a to 5b acts as a rigid body.

Figure 6:
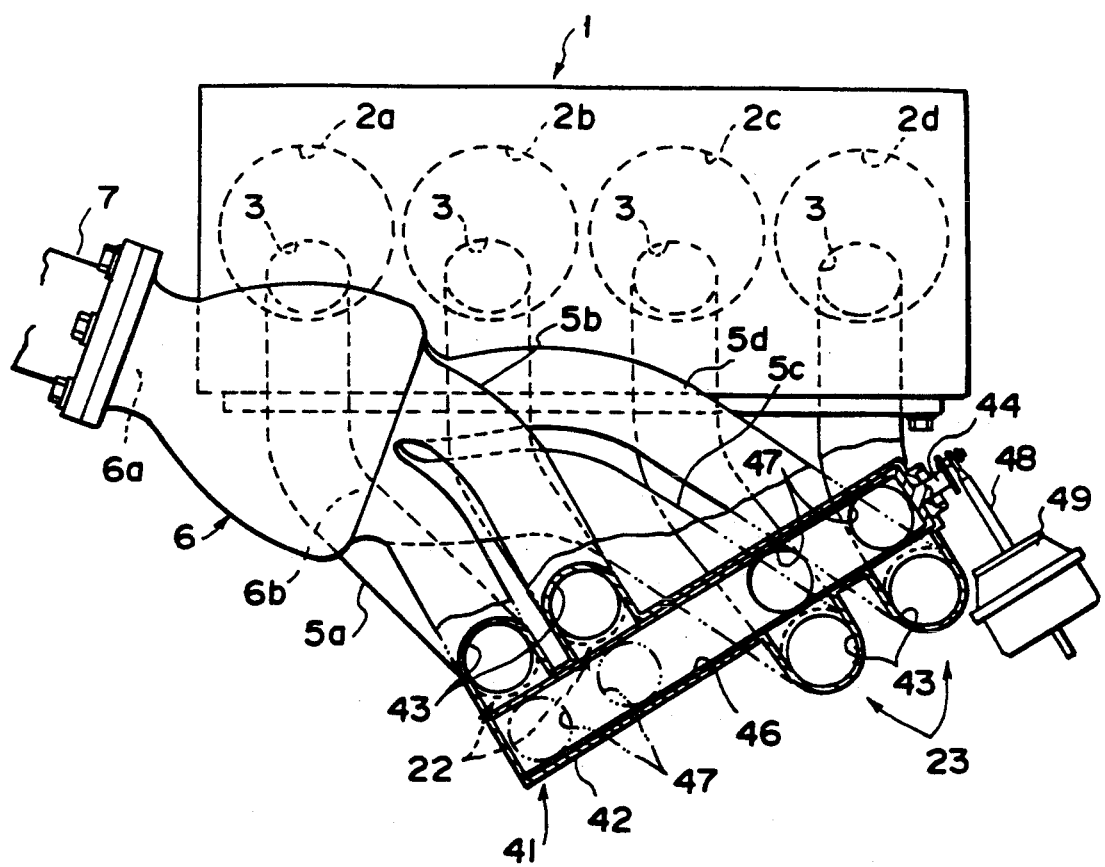
FIG. 6 is a view similar to FIG. 1 but showing a third embodiment of the present invention.

In the third embodiment shown in FIG. 6, the bent portions 23 of the discrete intake passages 5c and 5d are displaced outward relative the bent portions 22 of the discrete intake passages 5a and 5b, and a rotary valve 41 linearly extends from the outer side of the bent portion 22 of the discrete intake passage 5a to the inner side of the bent portion 23 of the discrete intake passage 5d across the outer side of the bent portion 22 of the discrete intake passage 5b and the inner side of the bent portion 23 of the discrete intake passage 5c and connected to the outer sides of the discrete intake passages 5a and 5b and the inner sides of the discrete intake passages 5c and 5d.

The rotary valve 41 comprises a cylindrical valve casing 42 and a cylindrical valve body 45 closely fitted in the valve casing 42. The valve casing 42 is formed integrally with the discrete intake passages 5a to 5d and communicates with the respective discrete intake passages 5a to 5d through openings 43 which are formed in the respective discrete intake passages 5a to 5d at portions equidistant from the intake ports 3. The valve body 45 is supported by a shaft 44 and is rotatable relative to the valve casing 42. The valve body 45 is provided with four openings 47 which are adapted to be aligned with the respective openings 43. When the valve body 45 is rotated to an open position in which the openings 47 in the valve body 45 are aligned with the openings 43, the discrete intake passages 5a to 5d are communicated with each other through a communicating passage 46 formed in the valve body 45. The support shaft 44 is connected to an actuator 49 by way of a lever 48, and the actuator 49 rotates the valve body 45 between the open position and a closed position in which the openings 47 are out of alignment with the openings 43. When the openings 47 are aligned with each other and the discrete intake passages 5a to 5d are communicated with each other, the pressure wave is reflected at the communicating passage 46. Thus the engine speed at which the inertia effect of intake air is maximized can be changed by opening and closing the rotary valve 41. The rotary valve 41 also functions as the stay for increasing the rigidity of the discrete intake passages 5a to 5d like the stay 31 in the second embodiment.

Figure 7:
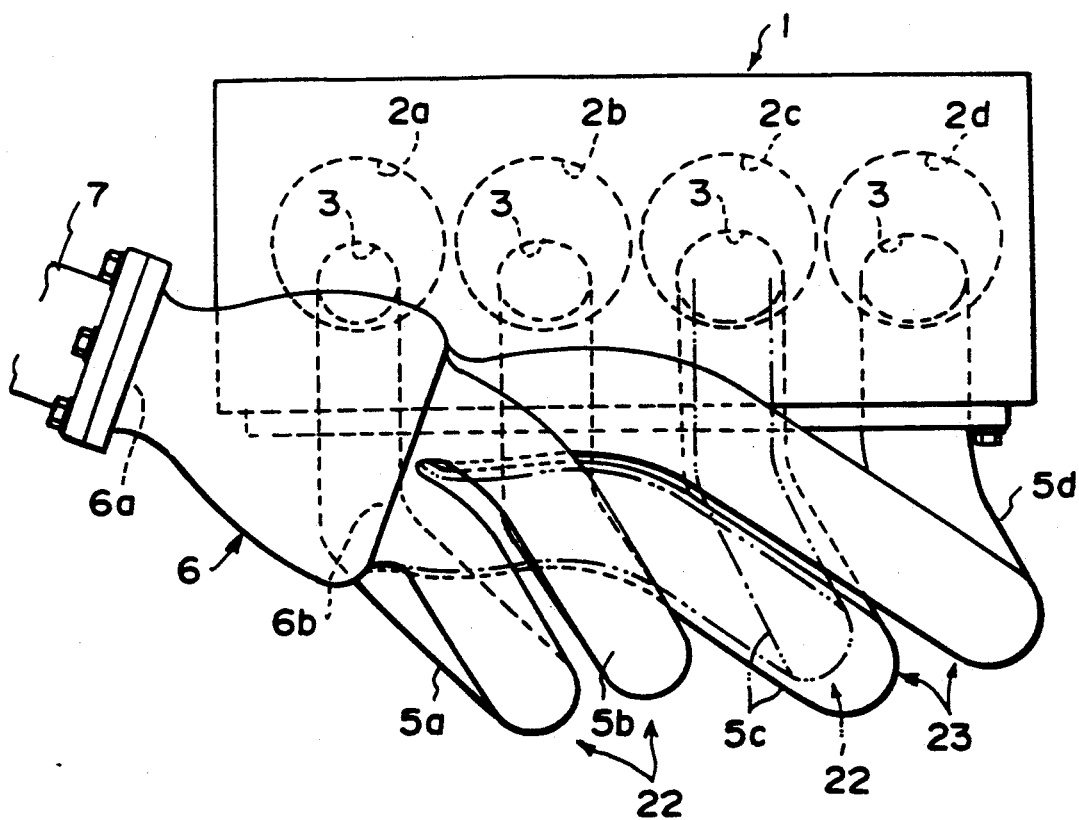
FIG. 7 is a view similar to FIG. 1 but showing a fourth embodiment of the present invention.

In the fourth embodiment shown in FIG. 7, the discrete intake passages 5c and 5d for the third and fourth cylinders 2c and 2d are larger than the discrete intake passages 5a and 5b for the first and second cylinders 2a and 2b both in length and cross-sectional area. Thus the intake resistance in the discrete intake passages 5c and 5d which are sharply bent is reduced. As is well known in the art, the effective passage length of a longer passage can be made equivalent to that of a shorter passage with respect to the inertia effect of intake air by increasing the cross-sectional area thereof. Thus in this embodiment, the intake resistance in the discrete intake passages 5c and 5d which are sharply bent can be reduced with out sacrificing the inertia supercharging effect.

Though in the fourth embodiment, both the discrete intake passages 5c and 5d are larger in length and cross-sectional area than the discrete intake passages 5a and 5b, the discrete intake passage 5c which is bent less sharply than the discrete intake passage 5d may be equal to the discrete intake passages 5a and 5b in length and cross-sectional area as shown by chained line in FIG. 7.

Figure 8:
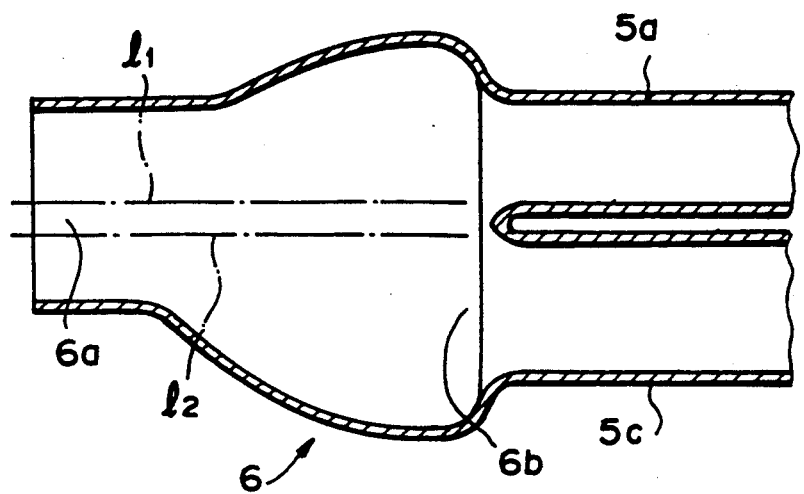
FIG. 8 is a cross-sectional view of the integrated chamber in a fifth embodiment of the present invention.
Figure 9:
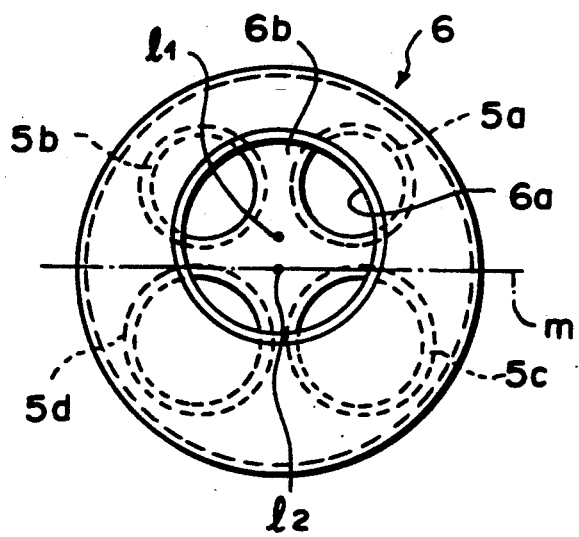
FIG. 9 shows the arrangement of the arrangement of the upstream ends of the discrete intake passages in the downstream side end face of the integrated chamber in the fifth embodiment.

In the fifth embodiment shown in FIGS. 8 and 9, the discrete intake passages 5c and 5d for the third and fourth cylinders 2c and 2d are larger than the discrete intake passages 5a and 5b for the first and second cylinders 2a and 2b both in length and cross-sectional area as in the fourth embodiment. The difference of the fifth embodiment from the fourth embodiment lies in the fact that the central axis (indicated at 11 in FIGS. 8 and 9) of the upstream side end face 6a of the integrated chamber 6 at which the common intake passage 7 opens to the integrated chamber 6 is displaced from the central axis (indicated at 12) of the downstream side end face 6b of the integrated chamber 6 toward the discrete intake passages 5a and 5b which are smaller than the discrete intake passages 5c and 5d in cross-sectional area. Generally more intake air flows into discrete intake passages which are larger in cross-sectional area and intake air cannot be uniformly distributed to discrete intake passages having different cross-sectional areas. In this embodiment, such a problem is solved by displacing the center of the common intake passage 7 toward the discrete intake passages having a smaller cross-sectional area.

Further, sixth to ninth embodiments of the present invention will be described with reference to FIGS. 10 to 17, hereinbelow. In FIGS. 10 to 17, the parts analogous to those shown in FIGS. 1 to 9 are given the same reference numerals and will not be described again.

Figure 10:
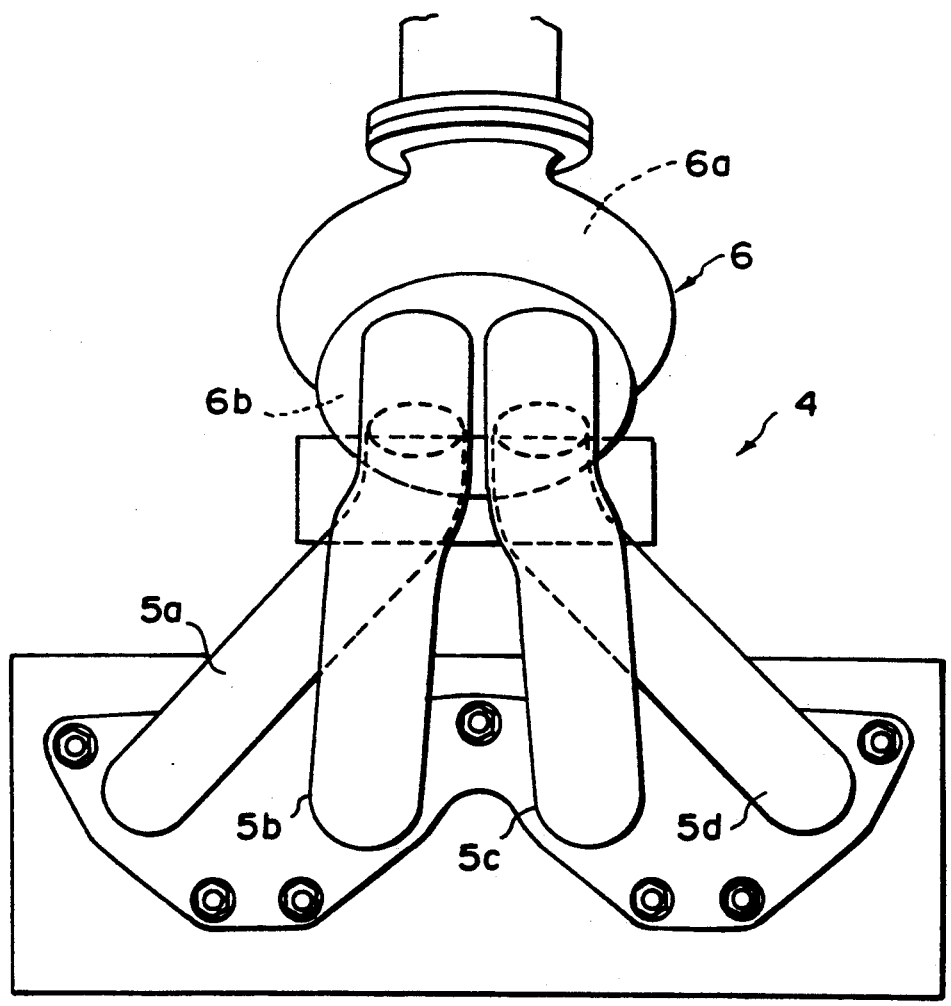
FIG. 10 is a side view of an intake system in accordance with a sixth embodiment of the present invention.
Figure 11:
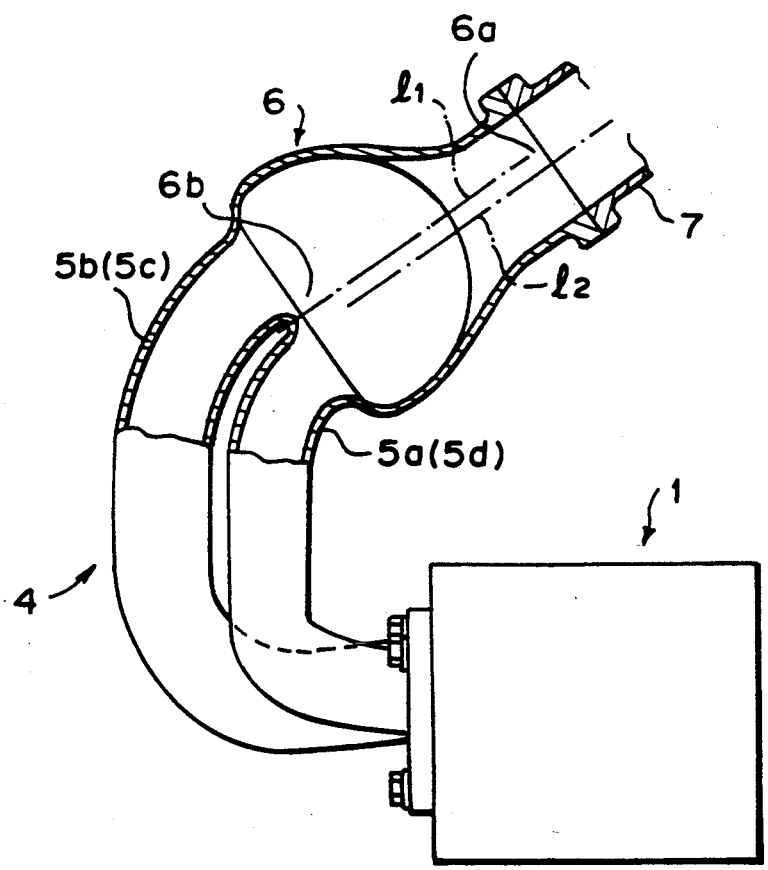
FIG. 11 is a front view of the intake system.
Figure 12:
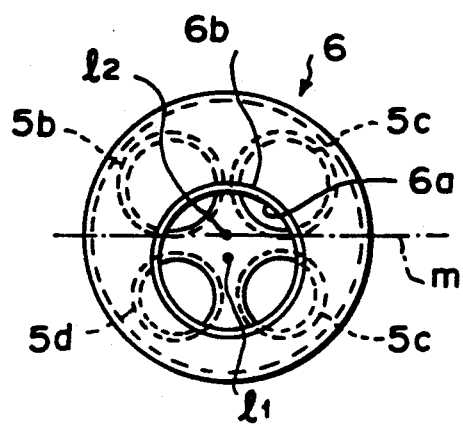
FIG. 12 shows the arrangement of the arrangement of the upstream ends of the discrete intake passages in the downstream side end face of the integrated chamber in the sixth embodiment.

In the sixth embodiment shown in FIGS. 10 to 12, the integrated chamber 6 is disposed above the engine 1 at the middle between the front and rear ends of the engine 1. Each of the discrete intake passages 5b and 5c for the second and third cylinders 2b and 2c which are nearer to the integrated chamber 6 than the other cylinders 2a and 2d extends horizontally from the engine 1 away from the engine 1, then bends upward and extends obliquely upward toward the integrated chamber 6. On the other hand, each of the discrete intake passages 5a and 5d for the cylinders 2a and 2d which is further from the integrated chamber 6 than the cylinders 2b and 2c extends horizontally from the engine 1 away from the engine 1, then bends upward and extends obliquely upward and inward toward the integrated chamber 6. The discrete intake passages 5a and 5d are bent more sharply than the discrete intake passages 5b and 5c and the upstream ends of the former positioned below the upstream ends of the latter. That is, as shown in FIG. 12, the discrete intake passages 5b and 5c open to the downstream side end face 6b of the integrated chamber 6 at the portion above the horizontal line m which is perpendicular to the central axis 1 of the downstream end face 6b of the integrated chamber 6, while the discrete intake passages 5a and 5d open to the downstream side end face 6b of the integrated chamber 6 at the portion below the horizontal line m.

The discrete intake passages 5b and 5c extend horizontally longer than the discrete intake passages 5a and 5b by a length larger than a distance by which the former is nearer to the integrated chamber 6 than the latter, and accordingly, the discrete intake passages 5b and 5c are longer than the discrete intake passages 5a and 5d. Further the discrete intake passages 5b and 5c are larger than the discrete intake passages 5a and 5d in cross-sectional area so that the natural frequencies of the discrete intake passages 5a to 5d are all equal to each other and their effective passage lengths are equivalent to each other with respect to the inertia effect of intake air.

Thus in this embodiment, the intake resistance in the discrete intake passages 5b and 5c which are sharply bent can be reduced with out sacrificing the inertia supercharging effect.

Further the central axis 11 of the upstream side end face 6a of the integrated chamber 6 at which the common intake passage 7 opens to the integrated chamber 6 is displaced from the central axis 12 of the downstream side end face 6b of the integrated chamber 6 toward the discrete intake passages 5a and 5d which are smaller than the discrete intake passages 5b and 5c in cross-sectional area. Generally more intake air flows into discrete intake passages which are larger in cross-sectional area and intake air cannot be uniformly distributed to discrete intake passages having different cross-sectional areas. In this embodiment, such a problem is solved by displacing the center of the common intake passage 7 toward the discrete intake passages having a smaller cross-sectional area.

Figure 13:
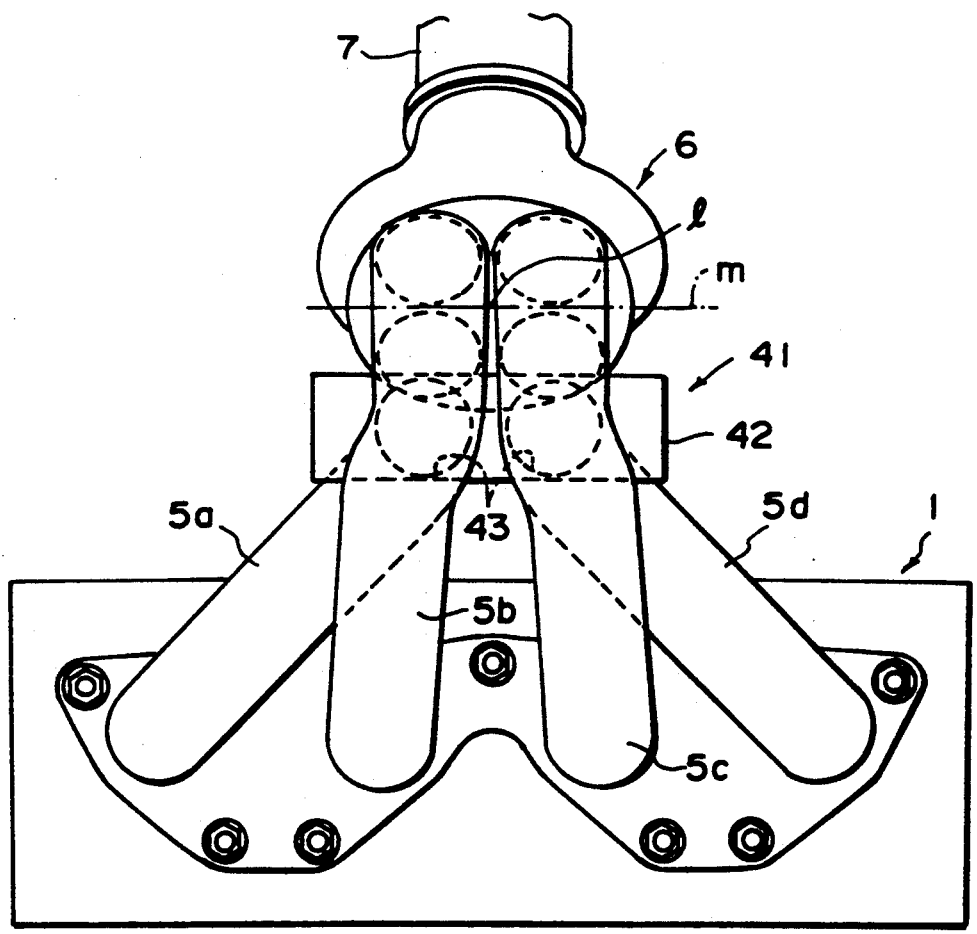
FIG. 13 is a view similar to FIG. 10 but showing a seventh embodiment of the present invention.
Figure 14:
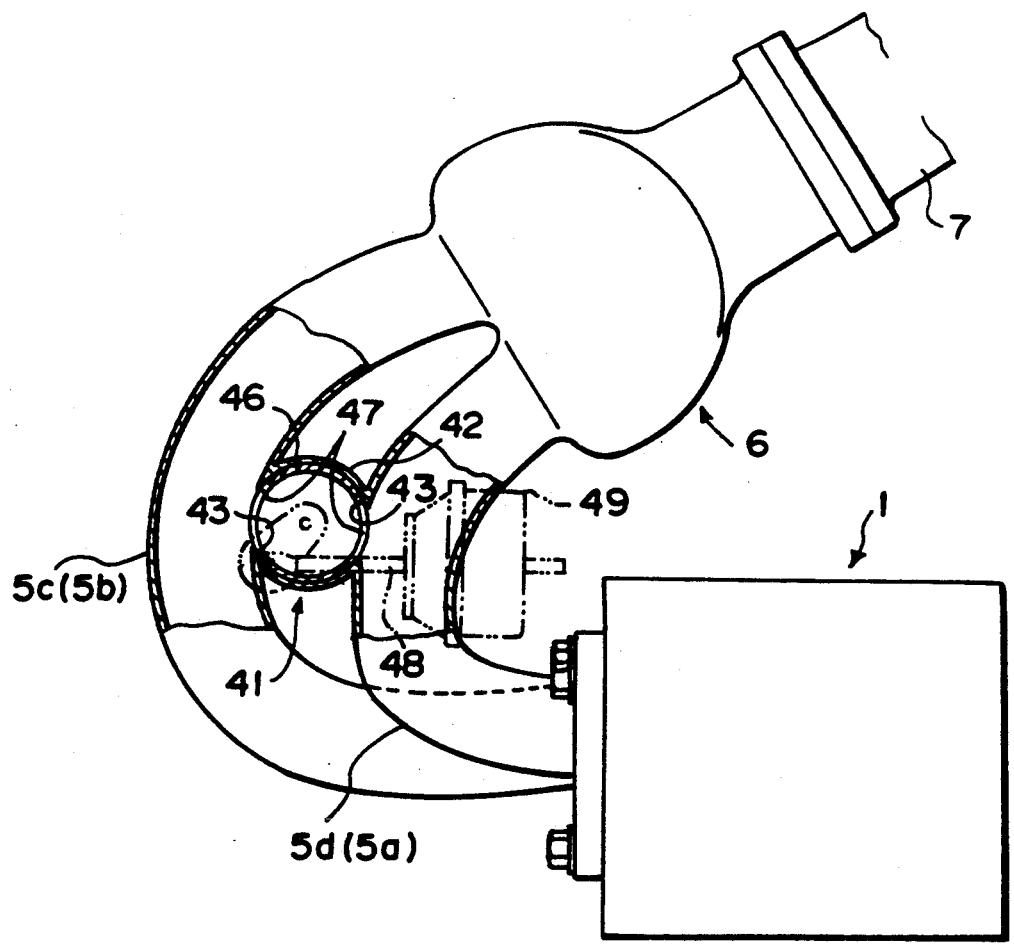
FIG. 14 is a front view of the seventh embodiment.

The seventh embodiment shown In FIGS. 13 and 14 is similar to the sixth embodiment except that the bent portions of the discrete intake passages 5a to 5d are connected by a rotary valve 41 which is similar to that used in the third embodiment.

That is, in the seventh embodiment, the bent portions of the discrete intake passages 5b and 5c are displaced outward relative the bent portions of the discrete intake passages 5a and 5d, and the rotary valve 41 linearly extends substantially in parallel to the cylinder row between the outer side of the bent portion of the discrete intake passage 5a and the inner side of the bent portion of the discrete intake passage 5b and between the outer side of the bent portion of the discrete intake passage 5d and the inner side of the bent portion of the discrete intake passage 5c and is connected to the outer sides of the discrete intake passages 5a and 5d and the inner sides of the discrete intake passages 5b and 5c.

The structure and the function of the rotary valve 41 in this embodiment are substantially the same as those in the third embodiment, and accordingly will not be described here.

Figure 15:
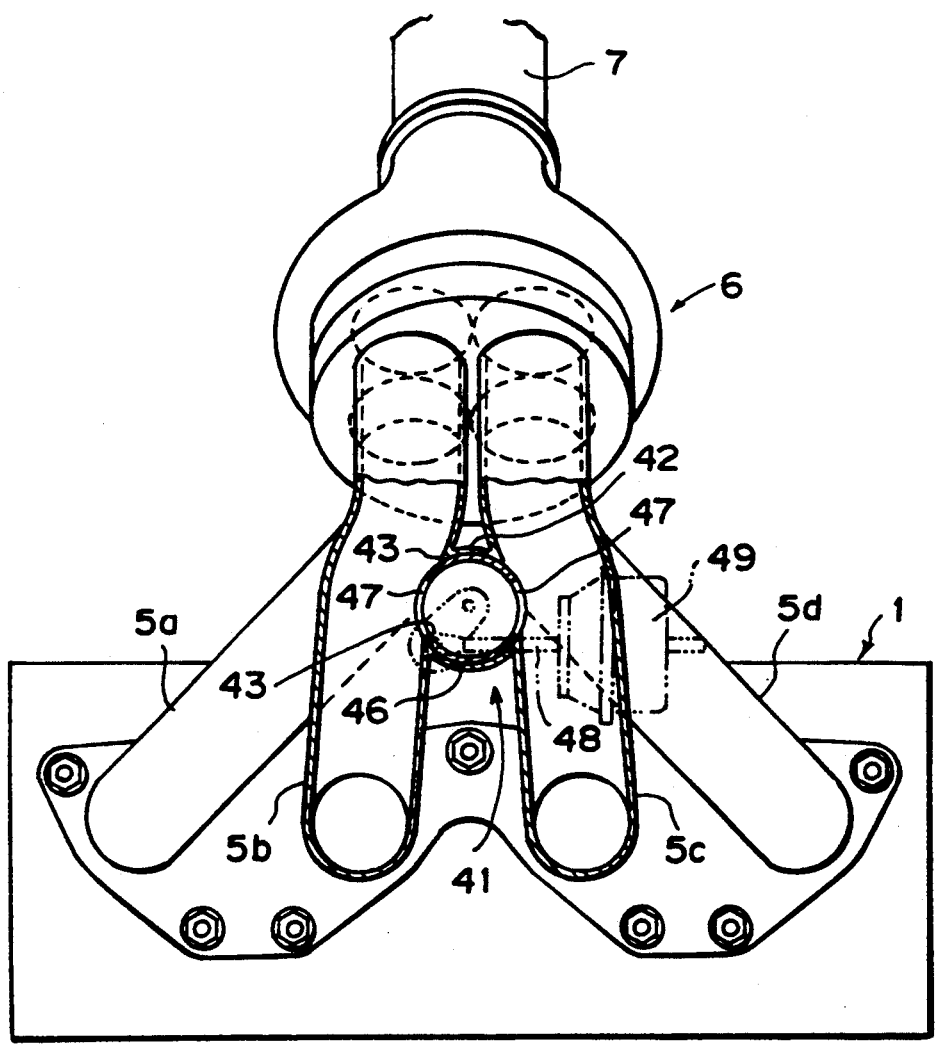
FIG. 15 is a view similar to FIG. 10 but showing an eighth embodiment of the present invention.
Figure 16:
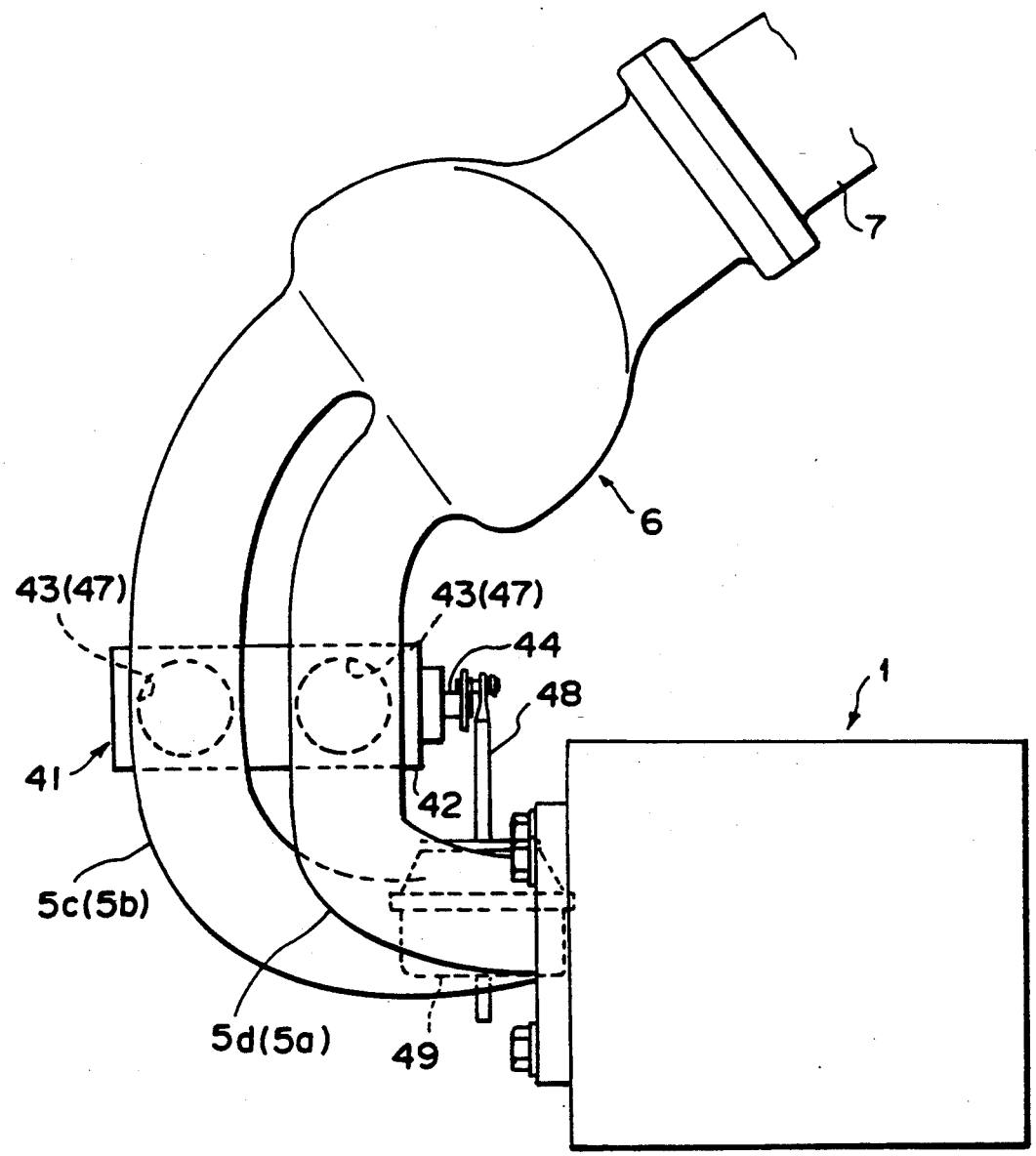
FIG. 16 is a front view of the eighth embodiment.

In the eighth embodiment shown in FIG. 15 and 16, the bent portions of the discrete intake passages 5b and 5c are displaced outward relative the bent portions of the discrete intake passages 5a and 5d, and the rotary valve 41 linearly horizontally extends substantially in perpendicular to the cylinder row between the bent portions of the discrete intake passages 5a and 5d and between the bent portions of the discrete intake passages 5b and 5c and is connected to the discrete intake passages 5a to 5d.

Figure 17:
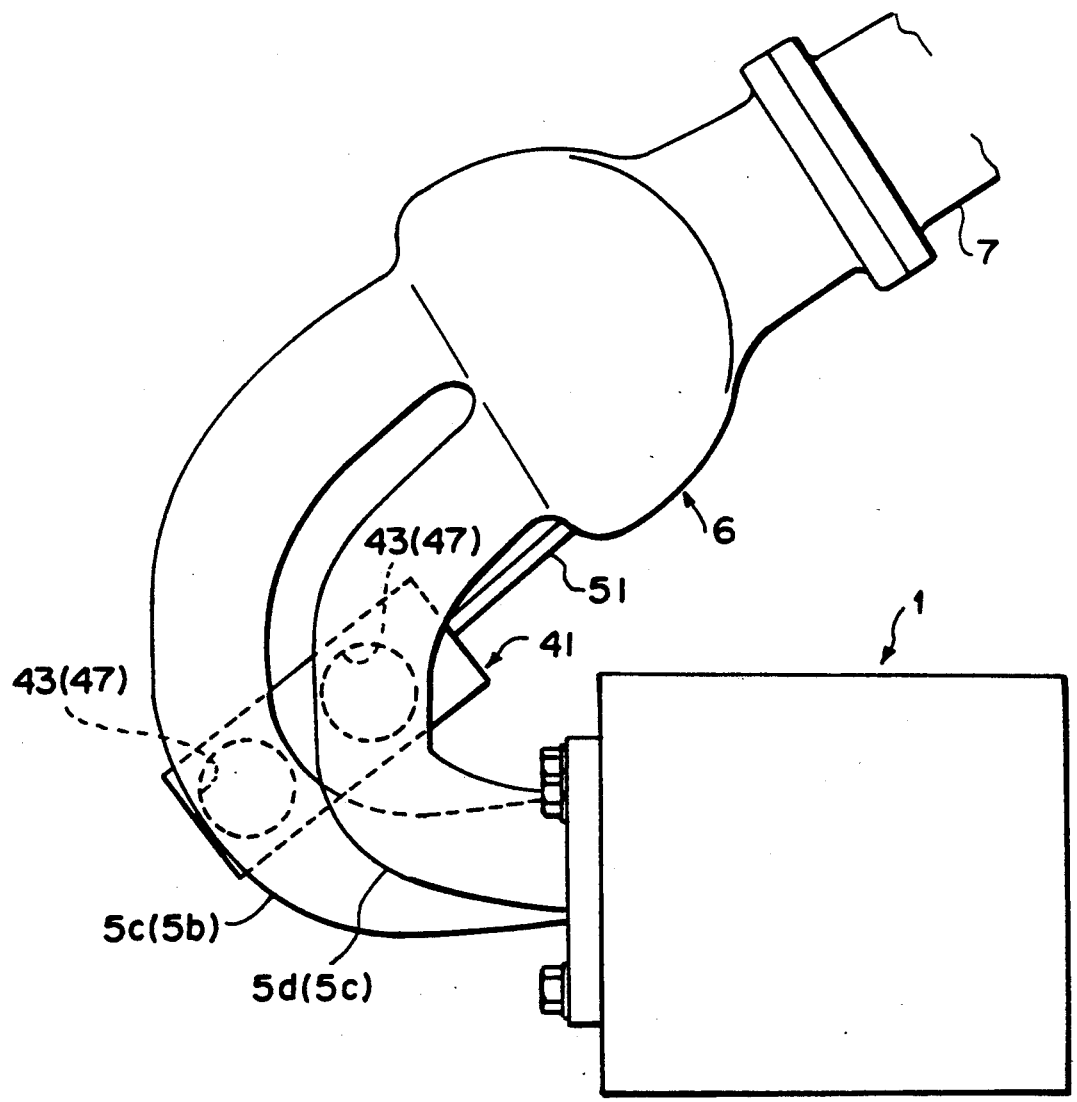
FIG. 17 is a view similar to FIG. 16 but showing a ninth embodiment of the present invention.

In the ninth embodiment shown in FIG. 17, the rotary valve 41 extends substantially in perpendicular to the cylinder row between the bent portions of the discrete intake passages 5a and 5d and between the bent portions of the discrete intake passages 5b and 5c and tilted. Further, the communicating passage 46 in the rotary valve 41 communicates with the integrated chamber 6 through a communicating pipe 51. In this embodiment, when the discrete intake passages 5a to 5d are communicated with each other through the communicating passage 46 in the rotary valve 41, intake air is fed to the communicating passage through the communicating pipe 51, which contributes to further increase in the engine output power. Further, the communicating pipe 51 forms a triangle together with the rotary valve 41 and the discrete intake passages 5a to 5d, whereby the rigidity of the discrete intake passage is further increased.

It is preferred that the upstream end portion of each of the discrete intake passages 5a to 5d be straight and tapered downstream. With this arrangement, intake resistance at the upstream end portion of each discrete intake passage is reduced and flow speed of intake air is increased, whereby air charging efficiency is increased and the engine output torque is increased. It is further preferred that the tapered end portion of the discrete intake passage be formed separately from the other part of the discrete intake passage. With this arrangement, incorporation of the intake manifold is facilitated.

Though, in the embodiments described above, the present invention is applied to a four-cylinder in-line engine, the present invention can also be applied to any other multiple-cylinder in-line engine. For example, in the case of a six-cylinder in-line engine, the discrete intake passages for three cylinders further from the integrated chamber than the other three cylinders are connected to the downstream side face of the integrated chamber at the lower portion and the other discrete intake passages are connected to the downstream side end face of the same at the upper portion. Otherwise, the discrete intake passages for the two cylinders furthest from the integrated chamber are connected to the downstream side end face of the integrated chamber at the lowermost portion thereof, the discrete intake passages for the two cylinders nearest to the integrated chamber are connected to the downstream side end face of the integrated chamber at the uppermost portion thereof, and the other discrete intake passages are connected to the downstream side end face of the integrated chamber at the intermediate portion thereof.

What is claimed is:

1. An intake system for a multiple-cylinder in-line engine comprising a cylinder row including a plurality of cylinders, a plurality of discrete intake passages which extend from one side of an engine body and communicate with respective cylinders of the engine at their downstream ends and merge into an integrated chamber at their upstream ends, the integrated chamber having a downstream side end face at which the discrete intake passages open to the integrated chamber and an upstream side end face at which a downstream end of a common intake passage opens to the integrated chamber;

wherein said integrated chamber is positioned above the engine body extending substantially horizontally and horizontally offset from a longitudinal midpoint of the cylinder row, and the discrete intake passages which communicate with cylinders relatively near to the integrated chamber open to an upper portion of the downstream side end face of the integrated chamber and the discrete intake passages which communicate with cylinders relatively far from the integrated chamber open to a lower portion of the downstream side end face.

2. An intake system as defined in claim 1 in which each of said discrete intake passages extends horizontally away from the engine body at the downstream end portion thereof and bends upward at an intermediate portion thereof, the discrete intake passages which communicate with cylinders relatively far from the integrated chamber bending more sharply than the discrete intake passages which communicate with cylinders relatively near to the integrated chamber.

3. An intake system as defined in claim 2 in which a stay member joins the inner sides of the intermediate portions of the discrete intake passages which communicate with cylinders relatively far from the integrated chamber and the outer sides of the intermediate portions of the discrete intake passages which communicate with cylinders relatively near to the integrated chamber.

4. An intake system as defined in claim 2 in which the intermediate portions of the discrete intake passages which communicate with cylinders relatively far from the integrated chamber are displaced outward relative to the intermediate portions of the discrete intake passages which communicate with cylinders relatively near to the integrated chamber and a rotary valve member extends substantially linearly across the discrete intake passages and joins the inner sides of the intermediate portions of the discrete intake passages which communicate with cylinders relatively far from the integrated chamber and the outer sides of the intermediate portions of the discrete intake passages which communicate with cylinders relatively near to the integrated chamber, the rotary valve member selectively communicates the discrete intake passages with each other in a predetermined engine speed range.

5. An intake system as defined in claim 2 in which the upstream ends of the discrete intake passages are regularly positioned about the center of the downstream side end face of the integrated chamber.

6. An intake system as defined in claim 5 in which the discrete intake passages which are bent more sharply are larger than the other discrete intake passages both in cross-sectional area and length.

7. An intake system as defined in claim 6 in which the center of the downstream end of the common intake passage is displaced from the center of the downstream side end face toward the discrete intake passages which are smaller in cross-sectional area and length.

8. An intake system for a multiple-cylinder in-line engine comprising a cylinder row including a plurality of cylinders, a plurality of discrete intake passages which extend from one side of an engine body and communicate with respective cylinders of the engine at their downstream ends and merge into an integrated chamber at their upstream ends, the integrated chamber having a downstream side end face at which the discrete intake passages open to the integrated chamber and an upstream side end face at which a downstream end of a common intake passage opens to the integrated chamber;

wherein said integrated chamber is positioned above the engine body extending substantially horizontally with a length of said integrated chamber extending substantially parallel to said cylinder row, and the discrete intake passages which communicate with cylinders relatively near to the integrated chamber open to an upper portion of the downstream side end face of the integrated chamber and the discrete intake passages which communicate with cylinders relatively far from the integrated chamber open to a lower portion of the downstream side end face.

9. An intake system for a multiple-cylinder in-line engine comprising a plurality of discrete intake passages which extend from one side of an engine body and communicate with respective cylinders of the engine at their downstream ends and merge into an integrated chamber at their upstream ends, the integrated chamber having a downstream side end face at which the discrete intake passages open to the integrated chamber and an upstream side end face at which a downstream end of a common intake passage opens to the integrated chamber;

wherein said integrated chamber is positioned above the engine body and extends substantially horizontally, and the discrete intake passages which communicate with cylinders relatively near to the integrated chamber open to an upper portion of the downstream side end face of the integrated chamber and the discrete intake passages which communicate with cylinders relatively far from the integrated chamber open to a lower portion of the downstream side end face, with each of said discrete intake passages extending horizontally away from the engine body at the downstream end portion thereof and bending upward at an intermediate portion thereof, the discrete intake passages which communicate with cylinders relatively far from the integrated chamber bending more sharply than the discrete intake passages which communicate with cylinders relatively near to the integrated chamber and a stay member joining the inner sides of the intermediate portions of the discrete intake passages which communicate with cylinders relatively far from the integrated chamber and the outer sides of the intermediate portions of the discrete intake passages which communicate with cylinders relatively near to the integrated chamber.

10. An intake system for a multiple-cylinder in-line engine comprising a plurality of discrete intake passages which extend from one side of an engine body and communicate with respective cylinders of the engine at their downstream ends and merge into an integrated chamber at their upstream ends, the integrated chamber having a downstream side end face at which the discrete intake passages open to the integrated chamber and an upstream side end face at which a downstream end of a common intake passage opens to the integrated chamber;

wherein said integrated chamber is positioned above the engine body and extends substantially horizontally, and the discrete intake passages which communicate with cylinders relatively near to the integrated chamber open to an upper portion of the downstream side end face of the integrated chamber and the discrete intake passages which communicate with cylinders relatively far from the integrated chamber open to a lower portion of the downstream side end face, with each of said discrete intake passages extending horizontally away from the engine body at the downstream end portion thereof and bending upward at an intermediate portion thereof, the discrete intake passages which communicate with cylinders relatively far from the integrated chamber bending more sharply than the discrete intake passages which communicate with cylinders relatively near to the integrated chamber and the intermediate portions of the discrete intake passages which communicate with cylinders relatively far from the integrated chamber are displaced outward relative to the intermediate portions of the discrete intake passages which communicate with cylinders relatively near to the integrated chamber and a rotary valve member extending substantially linearly across the discrete intake passages and joining the inner sides of the intermediate portions of the discrete intake passages which communicate with cylinders relatively far from the integrated chamber and the outer sides of the intermediate portions of the discrete intake passages which communicate with cylinders relatively near to the integrated chamber, the rotary valve member selectively communicating the discrete intake passages with each other in a predetermined engine speed range.

11. An intake system for a multiple-cylinder in-line engine comprising a plurality of discrete intake passages which extend from one side of an engine body and communicate with respective cylinders of the engine at their downstream ends and merge into an integrated chamber at their upstream ends, the integrated chamber having a downstream side end face at which the discrete intake passages open to the integrated chamber and an upstream side end face at which a downstream end of a common intake passage opens to the integrated chamber;

wherein said integrated chamber is positioned above the engine body and extends substantially horizontally, and the discrete intake passages which communicate with cylinders relatively near to the integrated chamber open to an upper portion of the downstream side end face of the integrated chamber and the discrete intake passages which communicate with cylinders relatively far from the integrated chamber open to a lower portion of the downstream side end face, with each of said discrete intake passages extending horizontally away from the engine body at the downstream end portion thereof and bending upward at an intermediate portion thereof, the discrete intake passages which communicate with cylinders relatively far from the integrated chamber bending more sharply than the discrete intake passages which communicate with cylinders relatively near to the integrated chamber, the upstream ends of the discrete intake passages being positioned about the center of the downstream side end face of the integrated chamber, and the discrete intake passages which are bent more sharply are larger than the other discrete intake passages both in cross-sectional area and length.

* * * * *